(12) United States Patent
Kasazumi et al.

(10) Patent No.: US 7,154,837 B2
(45) Date of Patent: Dec. 26, 2006

(54) OPTICAL PICKUP AND OPTICAL INFORMATION RECORDING/REPRODUCING DEVICE

(75) Inventors: Ken'ichi Kasazumi, Osaka (JP); Yasuo Kitaoka, Osaka (JP); Kiminori Mizuuchi, Osaka (JP); Kazuhisa Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 265 days.

(21) Appl. No.: 09/870,095

(22) Filed: May 30, 2001

(65) Prior Publication Data

US 2001/0055262 A1 Dec. 27, 2001

(30) Foreign Application Priority Data

May 31, 2000 (JP) .............................. 2000-161999

(51) Int. Cl.
 *G11B 7/135* (2006.01)
(52) U.S. Cl. .............................. 369/112.02; 369/112.22
(58) Field of Classification Search ............... 369/47.5, 369/53.26, 53.33, 100, 104, 112.01, 112.02, 369/112.05, 112.06, 112.21, 116, 118, 112.22, 369/111.15, 111.17, 124.03, 124.02
See application file for complete search history.

(56) References Cited

U.S. PATENT DOCUMENTS

| | | | | |
|---|---|---|---|---|
| 5,121,378 A | * | 6/1992 | Hirose et al. ............. | 369/112.2 |
| 5,519,685 A | * | 5/1996 | Kato et al. ............. | 369/112.19 |
| 5,581,531 A | * | 12/1996 | Ito et al. ..................... | 369/100 |
| 5,724,334 A | * | 3/1998 | Ohba et al. .................. | 369/118 |
| 5,737,299 A | | 4/1998 | Yoo et al. | |
| 5,796,683 A | * | 8/1998 | Sumi et al. .................. | 369/118 |
| 5,901,131 A | | 5/1999 | Ootaki et al. | |
| 5,930,219 A | | 7/1999 | Kim | |
| 5,936,923 A | | 8/1999 | Ootaki et al. | |
| 5,974,011 A | * | 10/1999 | Nakane .................. | 369/112.02 |
| 6,025,866 A | * | 2/2000 | Tsuchiya et al. ............. | 347/256 |
| 6,115,345 A | * | 9/2000 | Kato et al. ............. | 369/112.19 |
| 6,240,056 B1 | * | 5/2001 | Tanase et al. ............... | 369/47.5 |

FOREIGN PATENT DOCUMENTS

| | | | | |
|---|---|---|---|---|
| JP | 01084458 A | * | 3/1989 | |
| JP | 02091829 A | * | 3/1990 | |
| JP | 06150364 A | * | 5/1994 | |

(Continued)

OTHER PUBLICATIONS

English Translation of JP2000-113595.*

*Primary Examiner*—Wayne Young
*Assistant Examiner*—Jorge L. Ortiz-Criado
(74) *Attorney, Agent, or Firm*—Hamre, Schumann, Mueller & Larson, P.C.

(57) ABSTRACT

An optical pickup and an optical information recording/reproducing device are provided, each of which is capable of forming a super-resolution spot to conduct micro-mark recording, and does not undergo signal degradation due to an increased sidelobe in a reproducing operation. A variable phase filter having three regions to produce a phase difference in a radial direction is used, to provide a phase difference of $\pi$ between the center region and the side regions in a recording operation, so that a super-resolution spot is formed on a recording layer of the optical disk. In a reproducing operation, a phase difference is nullified between the regions of the variable phase filter, so that a normal light spot at a diffraction limit having a smaller sidelobe is formed. The variable phase filter can be formed with a homogeneous-alignment liquid crystal element.

4 Claims, 12 Drawing Sheets

FOREIGN PATENT DOCUMENTS

| | | | |
|---|---|---|---|
| JP | 06274932 A | * | 9/1994 |
| JP | 07287859 A | * | 10/1995 |
| JP | 07287860 A | * | 10/1995 |
| JP | 7-320295 | | 12/1995 |
| JP | 08329471 A | * | 12/1996 |
| JP | 09153227 A | * | 6/1997 |

* cited by examiner

Incident Light Beam Polarization Direction

OPTICAL PICKUP AND OPTICAL INFORMATION RECORDING/REPRODUCING DEVICE

BACKGROUND OF THE INVENTION

1. Field of the Invention

The present invention relates generally to an optical information processing device and an optical information recording/reproducing device in each of which a coherent light source is adapted, and particularly to a high-density optical disk recording/reproducing device that has a crosstalk removing function for removing a crosstalk component coming from adjacent tracks, and obtains a super-resolution condensed light spot in a size smaller than a diffraction limit.

2. Related Background Art

Recently, digital versatile disks (hereinafter abbreviated as DVDs) have been put to practical use, and this has led to a drastic increase in a storage capacity of an optical disk, allowing high-quality long-time motion picture information to be recorded therein. On the other hand, the high-definition motion picture broadcasting typified by HDTV broadcasting also is about to come into practical use, and this further accelerates the research and development of mass storage devices. Besides, optical disks such as compact disks (hereinafter abbreviated as CDs) and DVDs are widely utilized for external storage for computers, and as the performance of a computer is enhanced rapidly, higher-densification of an optical disk is earnestly demanded in the information processing and information communication fields. Particularly, as computers came to have improved performance, digital video cameras and digital still cameras started to be widely used, and then occasions for dealing massive acoustic imaging data increased. Consequently this caused high-speed-accessible large-capacity rewritable optical disks to occupy a more significant position than ever.

The expansion of the capacity of an optical disk is achieved by recording smaller marks in an optical disk or by reproducing information from a smaller pit, and the mark size or the pit size is limited by a size of a light spot that is determined by a light source wavelength of an optical pickup for reading information and a numerical aperture of an objective lens. If the size of a pit on a track provided in a spiral form, the size being in the line direction, is reduced to be equal to or smaller than the limit, a sufficient signal amplitude cannot be obtained. If a space between adjacent tracks is narrowed to be equal to or smaller than the limit, a drawback occurs in that marks in adjacent tracks are erased during a recording operation, and a drawback of crosstalk occurs in that signals from adjacent tracks interfere with reproduced signals during a reproducing operation, thereby hindering accurate signal recording/reproduction.

A super-resolution technique has been proposed as a technique to enable high densification beyond the limit of the light spot size. For instance, with a conventional optical pickup shown in FIG. 13A, a light spot 30' in a size smaller than the diffraction limit is obtained utilizing a phase filter 3' having circular zones (see FIG. 13C).

Though a spot width of a mainlobe is decreased as compared with a normal light spot, however, the light spot 30' has an increased sidelobe outside the mainlobe, as shown in FIG. 13B. Therefore, when a conventional optical pickup as shown in FIG. 13A is used for reproduction, the sidelobe irradiates pits before and after the pit irradiated by the mainlobe, and tracks adjacent to the track irradiated by the mainlobe. As a result, reflection light of the sidelobe is mixed with reflection light of the mainlobe and is detected by a light detector 7'. This causes noise signals to increase, thereby causing the signal quality to degrade.

SUMMARY OF THE INVENTION

An optical pickup of the present invention is an optical pickup capable of overcoming signal degradation due to a sidelobe, which has occurred with the super-resolution optical pickup as described above.

To solve the aforementioned problems, an optical pickup of the present invention includes: a coherent light source; a focusing optical system that converges and directs light from the coherent light source onto an information carrier; and a spot size adjustor that reduces a size of a light spot formed on the information carrier in a recording operation, relative to a size of a light spot in a reproducing operation, mainly in a direction perpendicular to an information track.

This makes it possible to provide an optical pickup that uses, for recording, a super-resolution spot to conduct micro-mark recording, while for reproduction, uses a normal spot having a decreased sidelobe, thereby hardly causing any degradation of reproduction signals due to a sidelobe.

A first configuration of the foregoing optical pickup includes a variable phase filter that is disposed between the coherent light source and the focusing optical system and that is capable of varying a quantity of a phase shift. The variable phase filter preferably is divided into at least three regions to produce a phase difference in the direction perpendicular to the information track of the information carrier.

A second configuration of the foregoing optical pickup includes a variable wavelength plate that is disposed between the coherent light source and the focusing optical system and that is capable of varying a quantity of birefringence, and an analyzer disposed in between the variable wavelength plate and the focusing optical system. The variable wavelength plate preferably is divided into at least three regions to produce a phase difference in the direction perpendicular to the information track of the information carrier.

A third configuration of the foregoing optical pickup includes: a variable wavelength plate that is disposed between the coherent light source and the focusing optical system and that is capable of varying a quantity of a phase shift; a variable polarization phase filter that provides a phase shift of a desired quantity to only a polarized component of a first polarization type among the light from the coherent light source; a polarized light separator that separates reflected light from the information carrier into a polarized component of the first polarization type, and a polarized component of a second polarization type that is different from the first polarization type; a first photodetector that detects the polarized component of the first polarization type of the reflected light from the information carrier; and a second phtodetector that detects the polarized component of the second polarization type of the reflected light from the information carrier. The variable polarization phase filter preferably is divided into at least four regions to produce a phase difference in the direction perpendicular to the information track of the information carrier.

Furthermore, to solve the aforementioned problems, a first optical information recording/reproducing device includes the optical pickup according to the first configuration. In the device, a phase difference is generated between the regions of the variable phase filter, when information is recorded in the information carrier, and a phase difference is not generated between the regions of the variable phase filter, when information is reproduced from the information carrier.

A second optical information recording/reproducing device includes the optical pickup according to the second configuration. In the device, a phase difference is generated between the regions of the variable wavelength plate when information is recorded in the information carrier, and a phase difference is not generated between the regions of the variable wavelength plate, when information is reproduced from the information carrier.

A third optical information recording/reproducing device includes the optical pickup according to the third configuration. In the device, the four regions of the variable polarization phase filter are first, second, third, and fourth regions, respectively, arranged in the direction perpendicular to the information track of the information carrier. When information is recorded in the information carrier, phase shifts of different quantities are provided with the first and fourth regions, and the second and third regions, respectively, while no phase shift is provided with the variable wavelength plate. When information is reproduced from the information carrier, phase shifts of different quantities that are different by $\pi$ are provided with the first and second regions, and the third and fourth regions, respectively, while a phase shift is provided with the variable wavelength plate so as to cause the variable wavelength plate to function as a half-wavelength plate.

BRIEF DESCRIPTION OF THE DRAWINGS

FIG. 2A is an explanatory view of the same in a recording operation, and FIG. 2B is an explanatory view of the same in a reproducing operation.

FIG. 7A is an explanatory view of a state in a recording operation, while FIG. 7B is an explanatory view of a state in a reproducing operation.

FIG. 8A is an explanatory view of a state in a recording operation, while FIG. 8B is an explanatory view of a state in a reproducing operation.

DETAILED DESCRIPTION OF THE INVENTION

First Embodiment

Figure 1A:
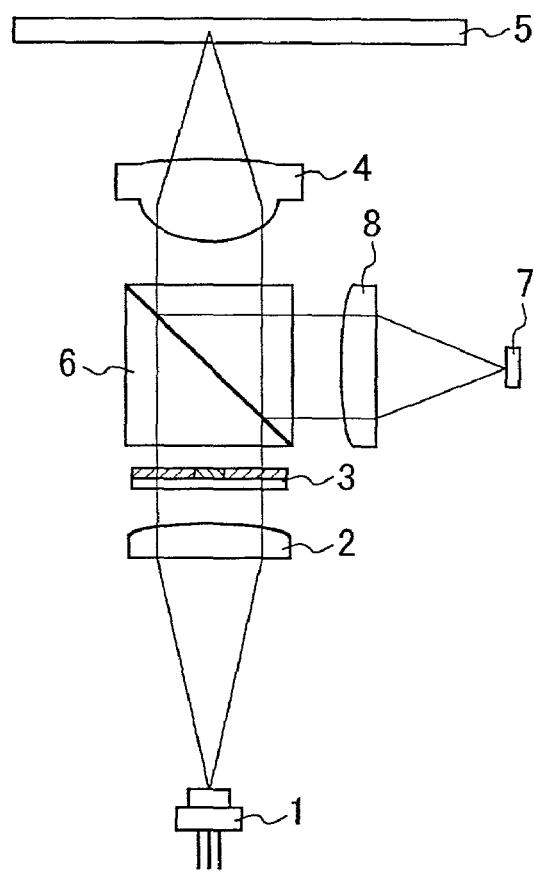
FIG. 1A is an explanatory view illustrating a schematic configuration of an optical pickup provided in an optical information recording/reproducing device according to an embodiment of the present invention.
Figure 1B:
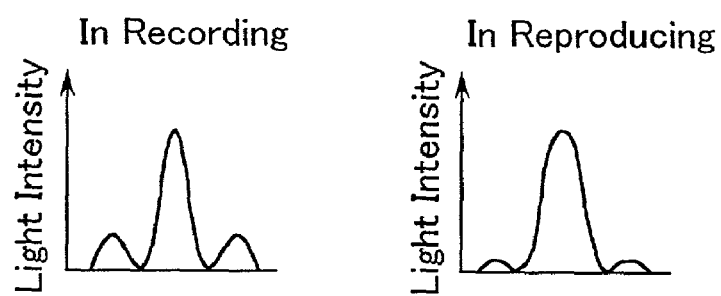
FIG. 1B shows graphs each showing a light intensity distribution of a light spot formed by the optical pickup.

The following description will depict an embodiment of the present invention while referring to the drawings. FIG. 1A is an explanatory view illustrating a schematic configuration of an optical pickup provided in an optical information recording/reproducing device according to the present embodiment. FIG. 1B shows graphs that illustrate a light intensity distribution of a light spot formed on an optical disk by the foregoing optical pickup in a recording operation, and a light intensity distribution of the same in a reproducing operation, respectively. The light intensity distribution is a distribution in a direction perpendicular to an information track on an optical disk.

As described above, a super-resolution optical pickup undergoes a drawback in that signal degradation is caused by a sidelobe appearing in a condensed light spot, but such an influence of the sidelobe is decreased upon recording of information to an optical disk since the recording is carried out with application of heat. Hence it is suitable for high-density optical recording for recording further smaller marks. Taking advantage of this property, for recording, the optical pickup of the present embodiment uses a super-resolution spot to conduct micro-mark recording, while for reproduction uses a normal spot having a decreased sidelobe. Besides, in super-resolution recording, even if the spot size is reduced in the spot traveling direction, this advantage of the micro-spot cannot be expected since it is lost due to sidelobes generated ahead and behind. Therefore, the optical pickup of the present embodiment is configured so as to have the spot size reduced only in the direction perpendicular to the information track.

The following description will explain a configuration of an optical pickup of the present embodiment, while referring to FIG. 1A. The optical pickup is provided with a semiconductor laser 1 as a light source, a collimator lens 2, a variable phase filter 3, an objective lens 4, a polarization beam splitter 6, and a light detector 7.

Figure 1C:
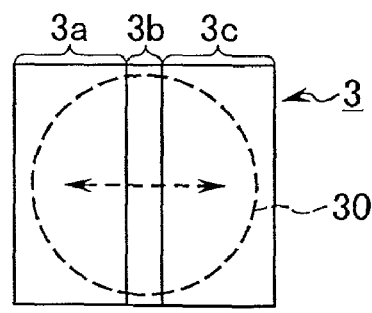
FIG. 1C is a plan view illustrating a configuration of a variable phase filter provided in the optical pickup.

The semiconductor laser 1 emits a polarized light in a direction parallel with a surface of a sheet carrying FIG. 1A. The emitted light passes through the collimator lens 2, and then passes through the variable phase filter 3. The variable phase filter 3 is divided into three regions 3a, 3b, and 3c, as illustrated in FIG. 1C, and is disposed between the collimator lens 2 and the polarization beam splitter 6 so that the lengthwise directions of these regions are parallel with a scanning direction of the light beam on an optical disk 5.

Figure 2A:
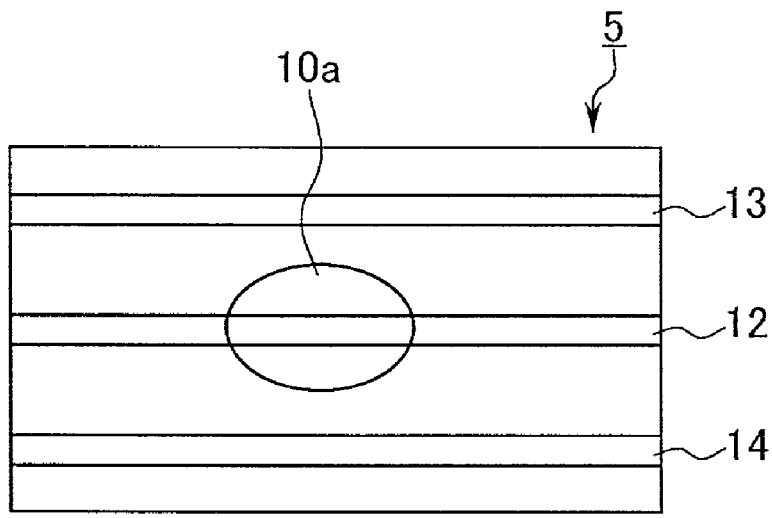
FIGS. 2A and 2B illustrate states of a light spot formed by the optical pickup shown in FIG. 1(a).
Figure 3:
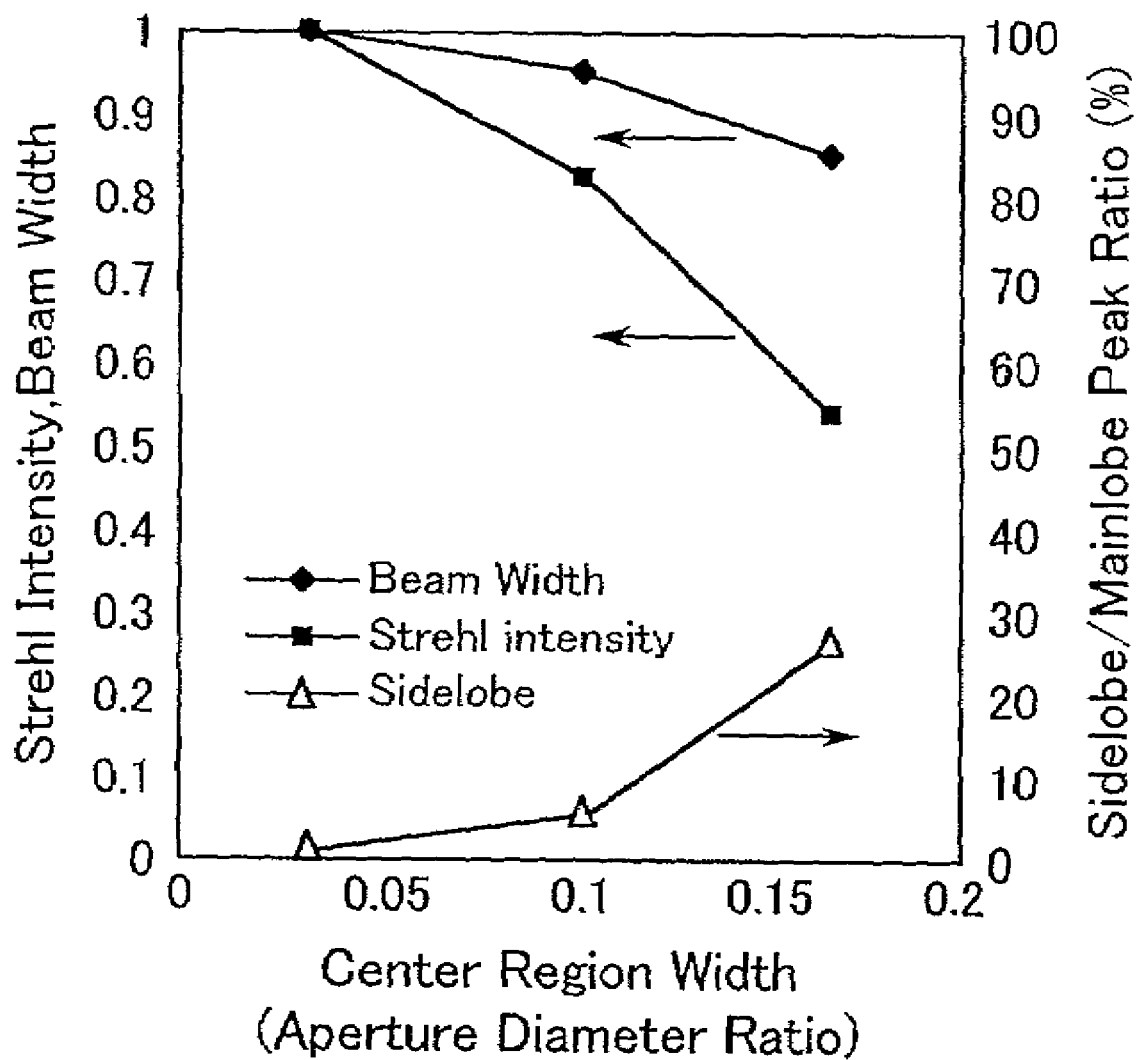
FIG. 3 is a graph showing variation of a super-resolution spot shape with respect to a width of a center region of the variable phase filter.

The variable phase filter 3 provides a phase difference of π between light passing through the region 3b at the center and light passing through the regions 3a and 3c on both sides, in recording information on the optical disk 5. The light beam having the phase difference exhibits a light intensity distribution as illustrated in the left-side graph of FIG. 1B, and forms on the optical disk 5 a super-resolution spot 10a having a spot width decreased in the direction perpendicular to the information track, as illustrated in FIG. 2A. FIG. 3 shows a width of the spot formed on an information recording layer of the optical disk 5, a sidelobe height of the spot, and a mainlobe peak height of the same (Strehl intensity), with respect to the width of the center region 3b of the variable phase filter 3.

As is clear from FIG. 3, as the width of the center region 3b increases, the super-resolution effect increases. Hence the spot width decreases, the sidelobe height increases, and the mainlobe peak height decreases. When the sidelobe height exceeds 20% of the mainlobe height, a mark is erased by the sidelobe. On the other hand, when the mainlobe peak height decreases, it is necessary to relatively increase the light emitting power of the light source. Therefore, an optimal width of the center region 3b is approximately 10% to 20% of the light beam width.

Figure 2B:
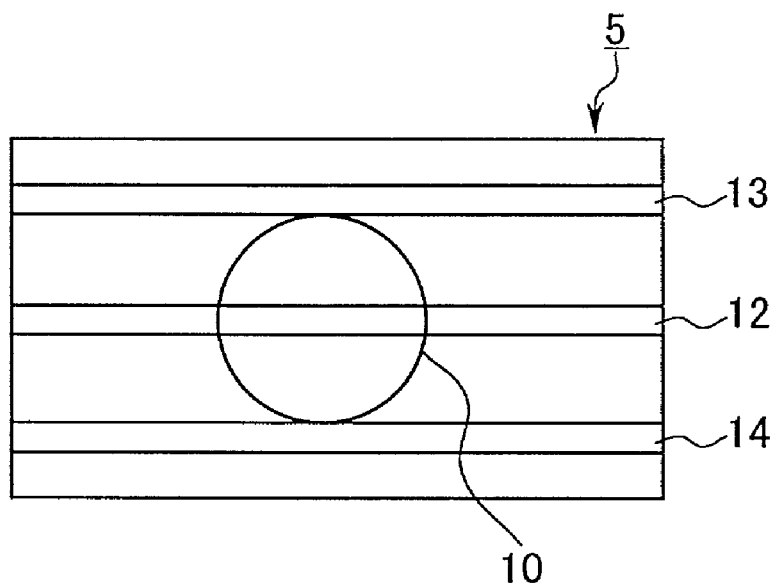

Furthermore, the optical pickup of the present embodiment nullifies the phase difference between light rays passing through the regions 3a, 3b, and 3c in reproducing signals from the optical disk 5. Thus, the light beam projected to the optical disk 5 exhibits a light intensity distribution in a reproducing operation as shown in the right-side graph of FIG. 1B. As a result, a normal light spot 10 at the diffraction limit that has a smaller sidelobe is formed on the optical disk 5, as illustrated in FIG. 2B.

The variable phase filter 3 used in the optical pickup of the present embodiment easily can be produced using a liquid crystal element, for instance. An example of a configuration and an operation of the variable phase filter 3 in which the liquid crystal element is used is shown in FIGS. 4A to 4C.

A liquid crystal element used as the variable phase filter 3 is composed of two glass substrates 60 and 61, with nematic liquid crystal being capsulated therebetween. FIGS. 4A to 4C schematically illustrate liquid crystal molecules 66 to explain an operation of the liquid crystal element: the major axis direction of the ellipse is an optical axis direction of the liquid crystal molecule 66. Transparent control electrodes 62, 63, and 64 and a counter electrode 65 are provided on the glass substrates 60 and 61, respectively, so that a certain electric field can be applied to the liquid crystal molecules 66 by applying a voltage to the control electrode. A region where the control electrode 62 is disposed corresponds to the center region 3b of the variable phase filter 3, and regions where the control electrodes 63 and 64 are disposed correspond to the regions 3a and 3c. Alignment films (not shown) provided on the control electrodes 62, 63, and 64 and on the counter electrode 65 are aligned in directions parallel with each other, whereby the liquid crystal element has a so-called homogeneous alignment. Incidentally, herein the alignment is in the direction perpendicular to the lengthwise direction of the regions 3a, 3b, and 3c, as shown with a broken arrow line in FIG. 1C.

Figure 4A:
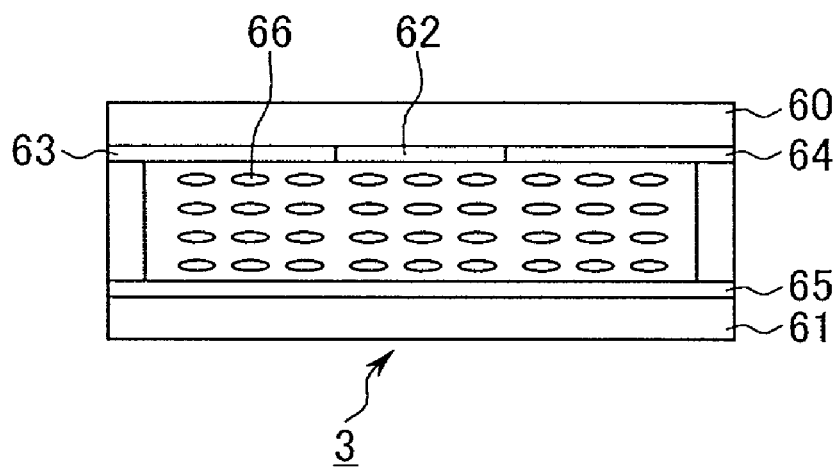
FIGS. 4A to 4C are explanatory views illustrating liquid crystal alignment states according to applied voltages, respectively, in the case where the variable phase filter is composed of a liquid crystal element.

FIG. 4A shows a state in which no voltage is applied across the counter electrode 65 and the control electrodes 62, 63, and 64. Here, the liquid crystal molecules 66 are aligned so that their optical axes are directed in the alignment direction. In the case where the liquid crystal molecules 66 are aligned as such, the nematic liquid crystal has an optical anisotropy. Accordingly, for both (i) the light rays entering a center part of the liquid crystal element, that is, the center region 3b of the variable phase filter 3 and (ii) the light rays entering side parts thereof, that is, the regions 3a and 3c, the polarized components parallel with the surface of the sheet carrying FIG. 4A propagate as extraordinary rays through the liquid crystal element, while polarized components perpendicular to the surface of the sheet propagate as ordinary rays through the liquid crystal element. Consequently, among the light rays entering the regions of the variable phase filter 3, both of the foregoing polarized components propagate without any phase difference.

Figure 4B:
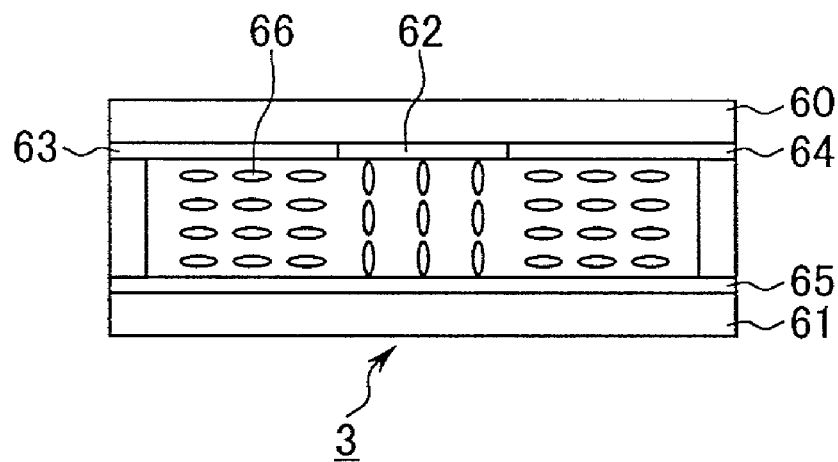
Figure 4C:
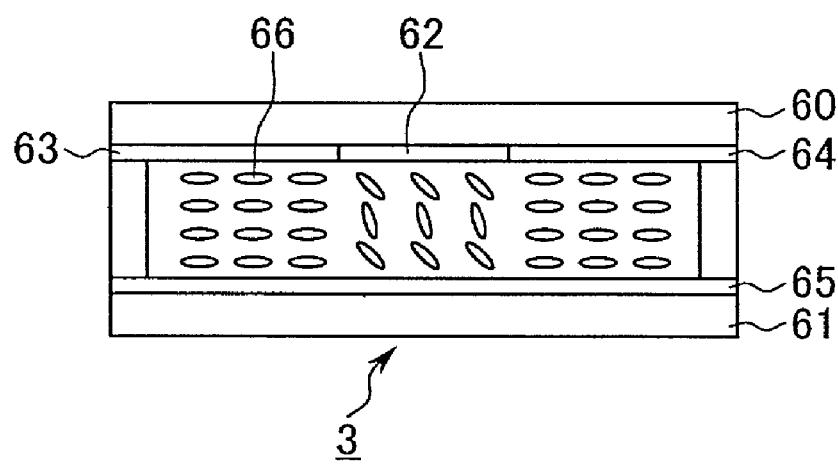

On the contrary, FIG. 4B shows a state of the liquid crystal element in which a voltage is applied only to the control electrode 62 at the center of the liquid crystal element. Here, an electric field directed in a thickness direction of the liquid crystal element is generated between the control electrode 62 and the counter electrode 65, and the liquid crystal molecules 66 are aligned in the direction of the electric field. Here, among the polarized components parallel with the sheet surface, those incident on the center part of the liquid crystal element, that is, the center region 3b of the variable phase filter 3, propagate as ordinary rays through the element, while those incident on the side parts, that is, the regions 3a and 3c, propagate as extraordinary rays through the element. Therefore, the regions have different indices of refraction of light, respectively, thereby providing a phase difference between the light rays having entered the center region and the side regions.

A phase difference quantity φ is expressed as:

$$\phi = d(n_e - n_o)$$

where d represents a thickness of the liquid crystal layer, $n_o$ represents an index of refraction that the liquid crystal applies to ordinary rays, and $n_e$ represents an index of refraction that the liquid crystal applies to extraordinary rays.

As described above, polarized light parallel with the alignment direction of the liquid crystal molecules is incident on the variable phase filter 3 used in the optical pickup shown in FIG. 1A, and a phase distribution according to the electrode division pattern is provided to the incident light. Besides, no phase difference occurs with polarized components perpendicular to the sheet surface since the components propagate as ordinary rays in all the regions. Hence any voltage application causes no phase shift, allowing the components to propagate as a plane wave.

The foregoing description explains a case where a sufficiently great voltage is applied across the electrodes, while FIG. 4C shows a state of the liquid crystal element in the case where an applied voltage is relatively small. In this case, in the vicinity of a portion where the control electrode 62 is disposed, that is, in the vicinity of the center region 3b of the variable phase filter 3, the liquid crystal molecules 66 are influenced by the alignment, rather than by the applied voltage, thereby being tilted so as to be approximately parallel with the electrode surface as shown in FIG. 4C. On the other hand, the liquid crystal molecules in the vicinity of the middle of the liquid crystal layer are influenced by the applied voltage, rather than the alignment, thereby tending to be aligned in the electric field direction. As a result, the liquid crystal molecules 66 are tilted obliquely to the electrode surface, as shown in FIG. 4C.

The liquid crystal molecules 66 are tilted at angles in closer approximation to right angles to the electrode surface when the applied voltage is sufficiently great, whereas they are tilted at angles in closer approximation to zero, to be approximately parallel with the electrode surface, when the applied voltage is small. Herein, polarized components parallel to the sheet surface that enter the center portion of the liquid crystal element (center region 3b) have an index of refraction that is intermediate between $n_e$ and $n_o$, and a quantity $\phi$ of a phase difference between the light rays incident to the center region 3b and the side regions 3a and 3c is:

$$\phi = \alpha \times d(n_e - n_o)$$

where $\alpha$ represents a constant that is in a range of 0 to 1, both inclusive, and is determined according to the applied voltage. In other words, by adjusting a value of the applied voltage, it is possible to set the phase difference quantity $\phi$ to a desired value.

A prototype of the foregoing liquid crystal element was prepared and subjected to measurement, to examine the relationship between the applied voltage and the phase difference. When red laser light with a wavelength of 650 nm was projected on an element having a liquid crystal layer having a thickness d of 10 μm, the phase difference quantity $\phi$ continuously exhibited a monotonic increase with respect to a voltage applied to the center control electrode 62: the phase difference quantity $\phi$ was $2\pi$ (one wavelength) when the applied voltage was 6.2 V. This proved that it is possible to cause only specific polarized components to have a desired phase difference, by using the liquid crystal element configured as shown in FIGS. 4A to 4C and controlling the applied voltage.

Incidentally, the turning ON/OFF of the voltage applied to the center control electrode 62 is controlled according to an operation the optical information recording/reproducing device carries out, which is either a recording operation or a reproducing operation. An output power of the semiconductor laser 1 in a recording operation is greater than that in a reproducing operation. Therefore, the device may be configured in the following manner: the turning ON/OFF of the applied voltage to the center control electrode 62 is controlled in association with the control of the output power of the semiconductor laser 1, so that a voltage is applied to the center control electrode 62 when the output power of the semiconductor laser 1 exceeds a predetermined value, while no voltage is applied thereto when the output power is less than the predetermined value.

Second Embodiment

Figure 5A:
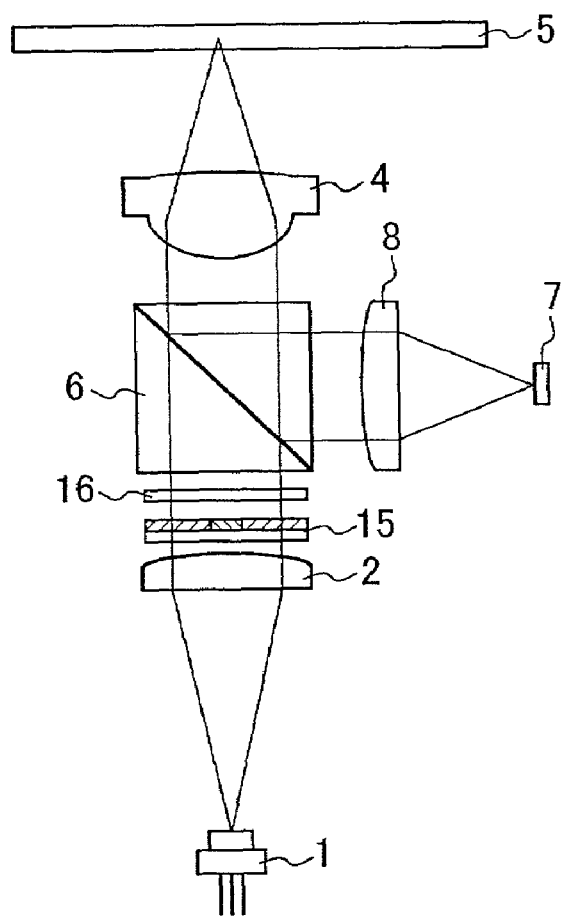
FIG. 5A is an explanatory view illustrating a schematic configuration of an optical pickup provided in an optical information recording/reproducing device according to another embodiment of the present invention.
Figure 5B:
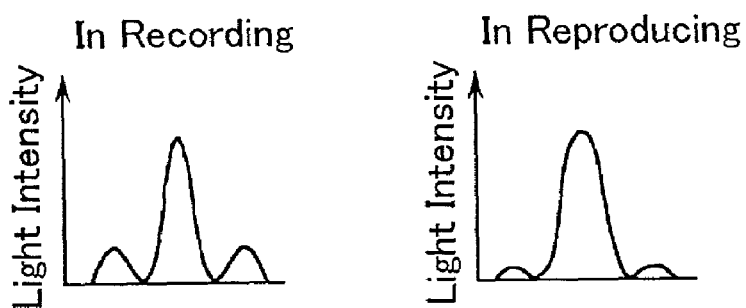
FIG. 5B shows graphs each showing a light intensity distribution of a light spot formed by the optical pickup.

The following description will depict another embodiment, while referring to the drawings. Incidentally, members having the same structures and functions as those depicted in the first embodiment will be designated by the same reference numerals, and descriptions of the same will be omitted. FIG. 5A is an explanatory view illustrating a schematic configuration of an optical pickup provided in an optical information recording/reproducing device of the present embodiment. FIG. 5B shows graphs that illustrate a light intensity distribution of a light spot formed on an optical disk by the foregoing optical pickup in a recording operation, and a light intensity distribution of the same in a reproducing operation, respectively. The light intensity distribution is a distribution in a direction perpendicular to an information track on an optical disk.

The optical pickup of the present embodiment differs from the optical pickup of the first embodiment in that the variable phase filter 3 in the latter is replaced with a combination of a variable wavelength plate 15 and an analyzer 16 in the former, as shown in FIG. 5A, but the optical pickup of the present embodiment is capable of achieving an identical effect to that of the optical pickup shown in FIG. 1A.

Figure 5C:
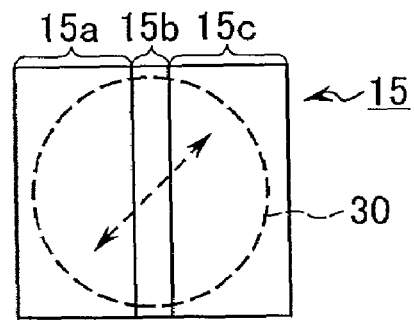
FIG. 5C is a plan view illustrating a configuration of a variable wavelength plate provided in the optical pickup.

The variable wavelength plate 15 is divided into three regions 15a, 15b, and 15c as illustrated in FIG. 5C, like the variable phase filter 3 of the first embodiment. The variable wavelength plate 15 can be composed of a liquid crystal element that has a homogeneous alignment and that is provided with control electrodes corresponding to the division regions, respectively, like the variable phase filter 3. However, it differs from the variable phase filter 3 in that the alignment direction of the liquid crystal is tilted at an angle of 45° with respect to a polarization direction of the incident light beam, as illustrated in FIG. 5C, As described above, the homogeneous alignment liquid crystal element functions to vary a phase shift of a polarized component parallel with the alignment direction, and to provide no phase shift to a polarized component perpendicular to the alignment direction, thereby serving as a wavelength plate capable of varying the phase shift quantity.

Polarized light parallel with the sheet surface is emitted from the semiconductor laser 1. A voltage applied to the center control electrode of the liquid crystal element as the variable wavelength plate 15 is controlled so that no phase shift is caused by the variable wavelength plate 15 in reproducing signals. An optical axis of the analyzer 16 is set so that polarized components parallel with the sheet surface of the sheet carrying FIG. 5A, like the light emitted by the semiconductor laser 1, are transmitted therethrough. This configuration allows the light from the semiconductor laser 1 to pass as plane waves through the variable wavelength plate 15 and the analyzer 16, not being modulated by the same, and hence causes a normal light spot having a light intensity distribution as shown in the right-side graph of FIG. 5B to be obtained on the optical disk 5. Consequently, a perfect circle light spot 10 is formed on the optical disk 5, as illustrated in FIG. 2B.

On the other hand, upon recording information, a voltage applied to the center control electrode of the liquid crystal element as the variable wavelength plate 15 is adjusted so that a phase shift of $\pi$ is given only to the light rays incident to the center region 15b. Here, since the center region 15b of the variable wavelength plate 15 functions as a half wavelength plate, the light rays having passed through the center region 15b have a polarization direction rotated through an angle of 90°, and hence cannot pass through the analyzer 16. Accordingly, a light intensity distribution of the light beam having passed through the analyzer 16 is such that a center portion is blocked. Thus, it is possible to obtain a super-resolution effect like that obtained by use of the first embodiment of the present invention. Consequently, the light beam projected to the optical disk 5 exhibits a light intensity distribution as shown by the left-side graph in FIG. 5B, and a light spot 10a is formed on the optical disk 5, as shown in FIG. 2A; the light spot 10a is in a size reduced in the direction perpendicular to the information track, as compared with the light spot 10 for reproduction.

Third Embodiment

The following description will depict still another embodiment of the present invention while referring to the drawings. Incidentally, members having the same structures and functions as those depicted in the above-described embodiments will be designated by the same reference numerals, and descriptions of the same will be omitted.

The description of the first and second embodiments depicts an optical pickup that decreases the mark width in a recording operation, but in addition to a problem in that recorded information in adjacent tracks is erased in a recording operation in the case where the track density is improved to or over a predetermined level, there is also a drawback of crosstalk occurring in a reproducing operation.

For instance, for a read-only digital versatile disk (DVD-ROM), laser light with a wavelength of 650 nm is condensed with an objective lens with a numerical aperture of 0.6, and a diameter of a condensed light spot is approximately 0.6 µm in terms of the full width at half maximum. Further, each space between adjacent tracks is set to 0.74 µm.

Here, assume that an optical disk is configured to achieve 1.3-time densification by reducing the pit size and track interval in the disk diameter direction, thereby having each track space narrowed to 0.57 µm, and signals are reproduced from the foregoing optical disk using the focusing optical system. In such a case, the signal quality degrades to an extent such that normal signal reproduction cannot be carried out, because of crosstalk components contained in reproduced signals.

In the case where recorded information is read with a condensed light spot, an influence of crosstalk remarkably appears when densification is increased so that a space between tracks is reduced to be approximately equal to a diameter of the condensed light spot. This is not limited to the foregoing DVD, but applies to any usual optical disk.

To overcome the foregoing problem of crosstalk, the optical disk system (optical information recording/reproducing device) according to the present embodiment is configured to use a super-resolution spot in a recording operation and to apply a crosstalk canceler in a reproducing operation, so that the optical disk system is applicable to a further densified optical disk. The crosstalk canceler is the following technique: in addition to an optical spot tracing a track as a target of reproduction, additional optical spots are used for detecting signals on adjacent tracks, so that crosstalk components coming from adjacent tracks and contained in a reproduced signal are removed by electrical differential calculation.

Figure 6A:
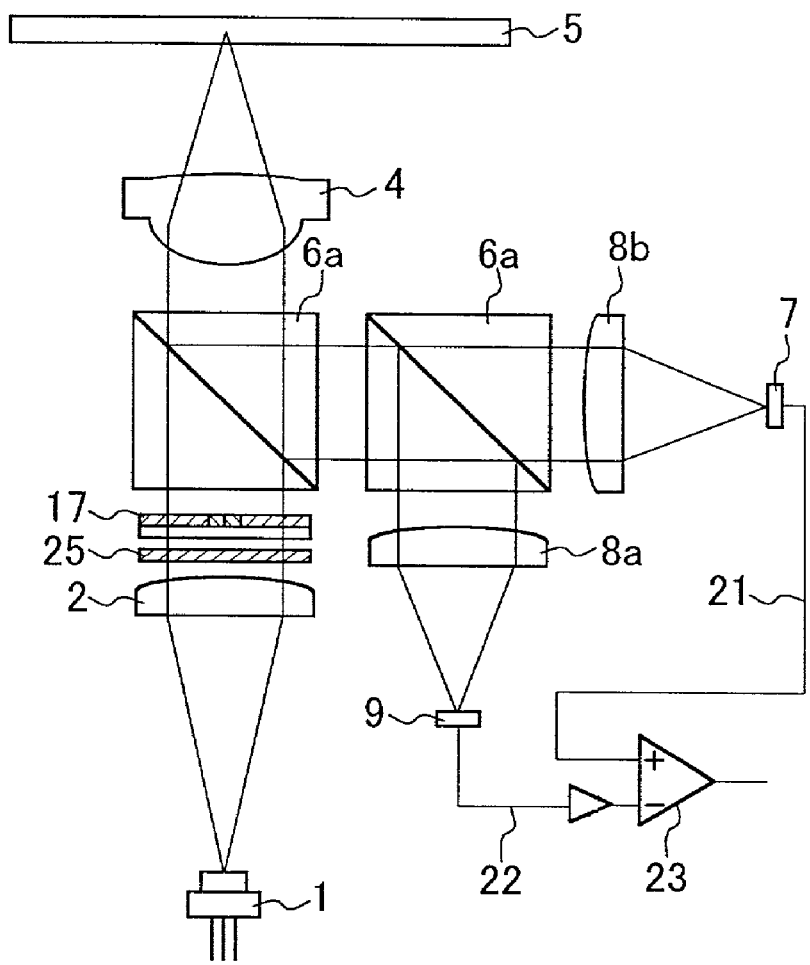
FIG. 6A is an explanatory view illustrating a schematic configuration of an optical pickup provided in an optical information recording/reproducing device according to still another embodiment of the present invention.

An example of the crosstalk canceller is taught by JP7-320295A (1995) in detail, for instance. The crosstalk canceler taught therein is as follows: two light intensity peaks (sub spots) are generated on the right and left sides of the main spot, at positions coinciding with adjacent tracks on the sides of the reproduction-target track on which the main spot scans, respectively, so that crosstalk components coming from the adjacent tracks can be detected simultaneously along with the signals from the reproduction-target track. FIG. 6A illustrates an optical disk system according to the present embodiment, in which the super-resolution technique is combined with the crosstalk canceler taught in the JP7-320295A.

As shown in FIG. 6A, the optical disk system of the present embodiment is equipped with an optical pickup that includes a semiconductor laser 1, a collimator lens 2, a variable wavelength plate 25, a variable polarization phase filter 17, a polarization beam splitter 6a and a half mirror 6b, an objective lens 4, condenser lenses 8a and 8b, photodetectors 7 and 9, and a differential calculator 23.

Figure 6B:
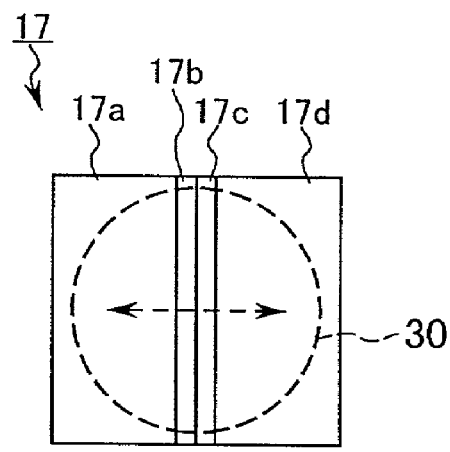
FIG. 6B is a plan view illustrating a configuration of a variable polarization phase filter provided in the optical pickup.

The variable polarization phase filter 17 is divided into four regions 17a, 17b, 17c, and 17d as illustrated in FIG. 6B, and is disposed between the variable wavelength plate 25 and the collimator lens 2 so that lengthwise directions of these regions are parallel with a scanning direction of the light beam on an optical disk 5.

The variable polarization phase filter 17 easily can be configured with a liquid crystal element, like the variable phase filter 3 according to the first embodiment. More specifically, like the configuration shown in FIGS. 4A to 4C in conjunction with the first embodiment, the variable polarization phase filter 17 may be configured with a liquid crystal element as follows: the liquid crystal element is formed by sealing nematic liquid crystal between glass substrates, has a homogeneous alignment, and is provided with control electrodes corresponding to the four division regions 17a, 17b, 17c, and 17d, respectively. The alignment direction of the liquid crystal is set parallel with the polarization direction of the incident light beam, which is shown with a broken arrow line in FIG. 6B.

Figure 9:
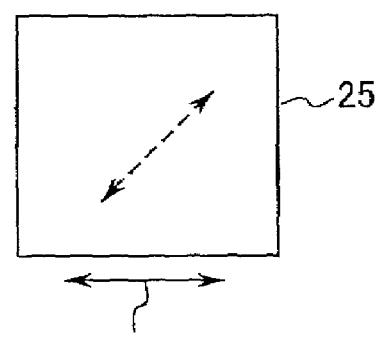
FIG. 9 is an explanatory view illustrating an alignment direction of a variable wavelength plate.

The variable wavelength plate 25 likewise can be composed of a liquid crystal element easily. More specifically, like the variable phase filter 3 shown in FIGS. 4A to 4C in conjunction with the first embodiment, the variable wavelength plate 25 is formed by sealing nematic liquid crystal between glass substrates, and has a homogeneous alignment. However, as illustrated in FIG. 9, control electrodes are formed uniformly throughout an entire surface of the element, and the liquid crystal is aligned in a direction tilted at 45° to the polarization direction of the incident light beam.

Without application of an electric field to the liquid crystal element as the variable wavelength plate 25, the liquid crystal molecules are aligned in parallel with the alignment direction, and birefringence occurs in a direction parallel with the optical axes of the liquid crystal molecules, thereby causing the liquid crystal element to function as a wavelength plate. When a voltage is applied to the control electrodes, thereby causing an electric field perpendicular to the substrate surface of the liquid crystal element to be applied to the liquid crystal element, the liquid crystal molecules are aligned in parallel with the applied electric field, that is, in a direction perpendicular to the substrate surface. In this case, the liquid crystal element has an in-plane isotropic property, losing the property of birefringence. By appropriately setting the thickness of the liquid crystal layer of the variable wavelength plate 25, it is possible to realize the variable wavelength plate 25 that functions as a half wavelength plate or a quarter wavelength plate in absence of an electric field, as well as to nullify the phase shift quantity upon application of an electric field.

The following description will depict an operation of an optical disk system thus configured according to the present embodiment.

First of all, an operation upon signal reproduction is as follows. The semiconductor laser 1 emits linearly polarized light having only polarized components parallel with a sheet surface of FIG. 6A, for instance. Upon signal reproduction, a phase shift quantity that the variable wavelength plate 25 provides is adjusted so that the variable wavelength plate 25 functions as a quarter wavelength plate. The emitted light from the semiconductor laser 1 passes through the variable wavelength plate 25, whereby polarized components perpendicular to the sheet surface of FIG. 6A and polarized components parallel with the same are generated. Hereinafter the polarized components perpendicular to the sheet surface are referred to as a main beam, while those parallel with the sheet surface are referred to as a sub beam.

The variable polarization phase filter 17 has a property of causing a phase shift in only the polarized components parallel with the sheet surface, while causing no phase shift in the polarized components perpendicular to the sheet surface. Therefore, the main beam is not caused to have a phase shift by the variable polarization phase filter 17. Hence a spot of light converged by the objective lens 4 and projected to the optical disk 5 is an ordinary condensed light spot at the diffraction limit (main spot 10), as shown in FIG. 7B.

Figure 7A:
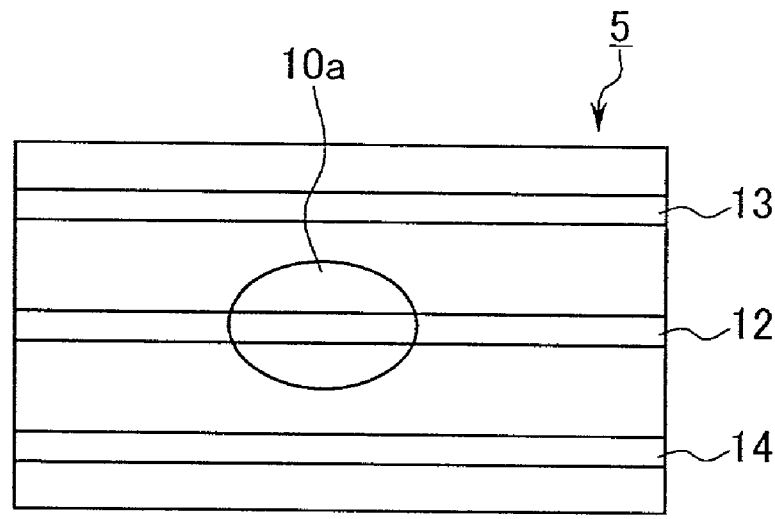
FIGS. 7A and 7B illustrate states of a light spot formed by the optical pickup shown in FIG. 6A.
Figure 7B:
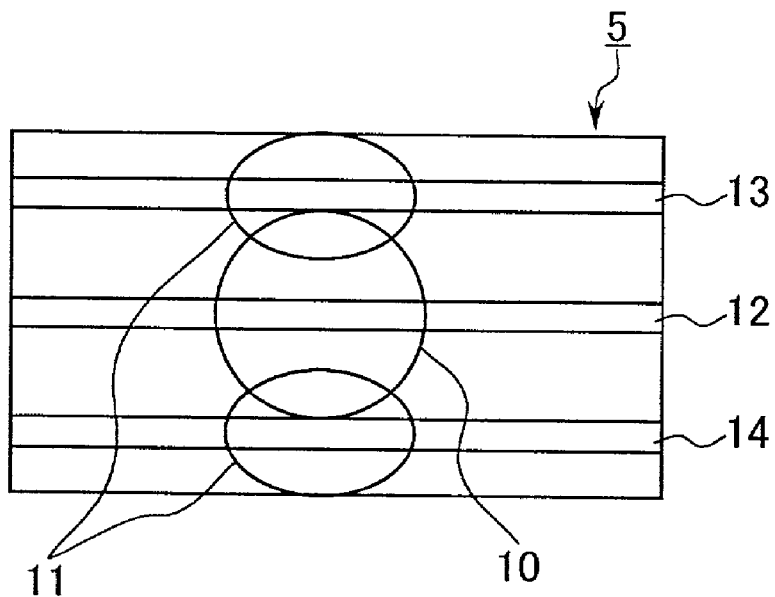

The main spot 10 is controlled so as to fall on a reproduction-target track 12 as shown in FIG. 7B, and an intensity of reflection light therefrom is modulated according to a pit (not shown) of the reproduction-target track 12. Here, in the case where the optical disk is a high-density optical disk having narrowed track spaces, the main spot 10 also irradiates adjacent tracks 13 and 14 as described above, thereby causing crosstalk components to be mixed in reproduced signals.

Figure 8A:
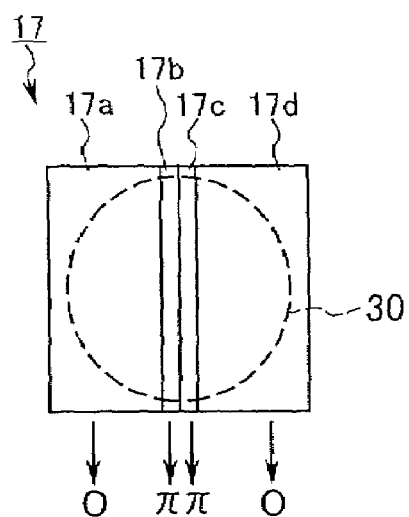
FIGS. 8A and 8B illustrate states of a variable phase filter provided in the optical pickup shown in FIG. 6A.
Figure 8B:
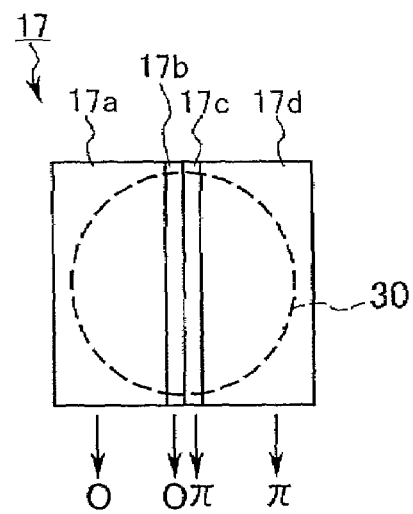

Upon signal reproduction, the variable polarization phase filter 17 causes the sub beam to have a phase shift such that light having passed through the two right regions 17c and 17d has a phase difference of $\pi$ as compared with light having passed through the two left region 17a and 17b, as shown in FIG. 8B. When the sub beam is converged by the objective lens 4 and projected onto the optical disk 5, two optical intensity peaks (sub spots 11) are formed on both the sides to the main spot 10, respectively, so as to fall on the adjacent tracks 13 and 14 on the left and right sides, respectively, as shown in FIG. 7B. Intensities of reflection light of these sub spots are modulated according to pits of the adjacent tracks 13 and 14, respectively.

Reflection light from the optical disk 5 is separated by the polarization beam splitter 6b into the main beam and the sub beams, which are detected by the photodetectors 7 and 9, respectively. As a result, a main signal 21 mainly reflecting a signal from the reproduction-target track 12, and a sub signal 22 mainly reflecting signals from the adjacent tracks 13 and 14, are obtained. Then, the differential calculator 23 electrically generates a differential signal from the foregoing signals at an appropriate ratio, whereby a signal is obtained by removing crosstalk components from the main signal 21.

On the other hand, upon recording information on the optical disk 5, a phase shift quantity that the variable wavelength plate 25 provides is adjusted so that the variable wavelength plate 25 functions as a half wavelength plate. Here, all the laser light having passed through the variable wavelength plate 25 becomes polarized components perpendicular to the sheet surface of FIG. 6A, and then the components pass through the variable polarization phase filter 17. Upon information recording, the variable polarization phase filter 17 is adjusted so as to provide a phase shift such that light having passed through the two center regions 17b and 17c has a phase difference of $\pi$ as compared with light having passed through the two side regions 17a and 17d, as shown in FIG. 8A. This causes, like in the first embodiment, the laser light converged and projected onto the recording layer of the optical disk 5 to form a super-resolution spot 10a having a spot size decreased in the direction perpendicular to the information track, as shown in FIG. 7A. By so doing, narrow mark recording is made possible.

Figure 10A:
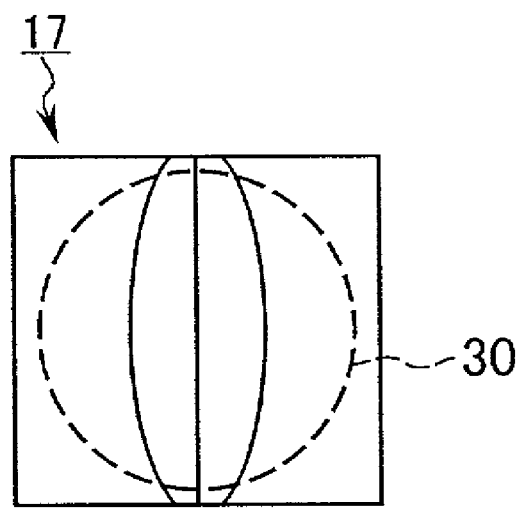
FIGS. 10A to 10C are plan views illustrating other configuration examples of the variable polarization phase filter provided in the optical pickup shown in FIG. 6A.
Figure 10B:
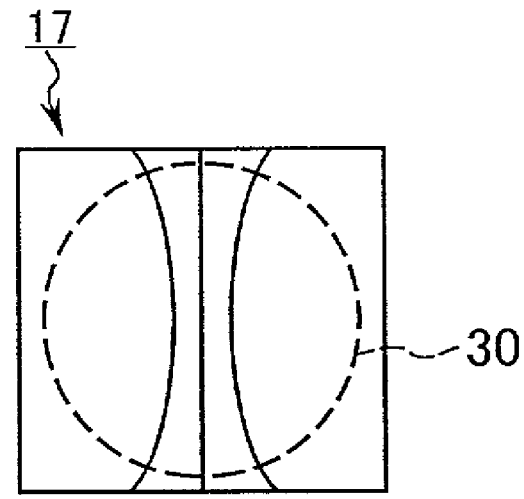
Figure 10C:
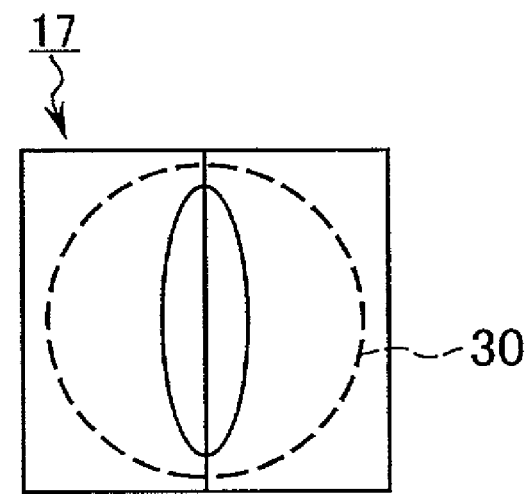

Incidentally, the variable polarization phase filter 17 is not limited to a configuration as described above in which each region has a set uniform width as illustrated in FIG. 6B. For instance, division patterns shown in FIGS. 10A through 10C may be used. The use of any one of these patterns provides an effect in that the height of the sidelobe occurring in the direction perpendicular to the information tracks decreases. It should be acknowledged that in the case of the pattern of FIG. 10C the spot size is reduced also in the direction along the information track. In this case, the spot can be reduced in the direction perpendicular to the information track to be 10% smaller than the size in a reproducing operation. To conduct a recording operation normally, however, the reduction rate in the direction along the information track is preferably not more than 5%.

The aforementioned embodiments are not to be construed as limiting the invention, and various modifications are allowed within the scope of the invention. For instance, an optical disk is taken as an example of an optical information carrier in the foregoing descriptions, and examples of the optical disk include a phase-change-type optical disk, a magneto-optical disk, a dye-based write-once optical disk, and other various disks.

Furthermore, the foregoing embodiments take as an example a configuration in which a liquid crystal element or the like is utilized to provide different phase shift quantities to light in a recording operation and in a reproducing operation, respectively, but apart from this configuration, the following configurations may be adapted to embody the present invention.

Figure 11A:
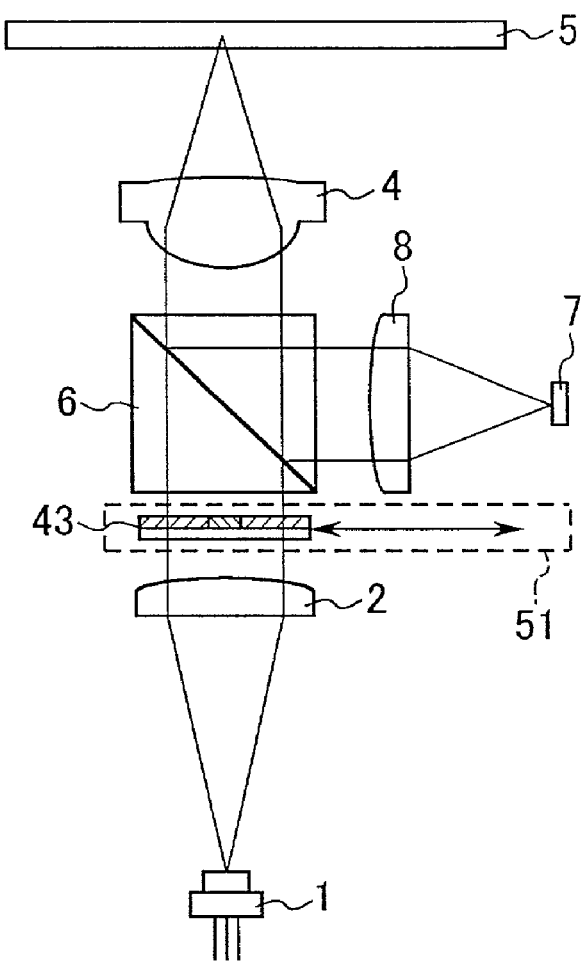
FIG. 11A is an explanatory view illustrating an optical pickup according to still another embodiment of the present invention.
Figure 11B:
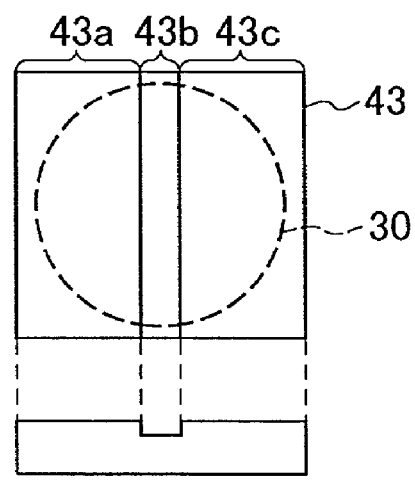
FIG. 11B is a plan view illustrating a configuration of a phase filter provided in the optical pickup.

For instance, an optical pickup as illustrated in FIG. 11A also is an embodiment of the present invention, which includes a filter moving mechanism 51 for mechanically inserting/removing a phase filter 43 into/from an optical path between the collimator lens 2 and the polarization beam splitter 6. The phase filter 43 is divided into three regions 43a, 43b, and 43c as illustrated in FIG. 11B, and provides a phase difference of $\pi$ between the center region 43b and the side regions 43a and 43c. The phase filter 43 is formed with, for instance, a transparent substrate having recesses and projections on its surface. More specifically, it may be produced by subjecting a glass substrate surface to selective etching, or by molding resin. By inserting the phase filter 43 in the optical path between the collimator lens 2 and the polarization beam splitter 6 in a recording operation and removing the same in a reproducing operation by means of the filter moving mechanism 51, an identical effect to that obtained with the optical pickup shown in FIG. 1A can be obtained.

Figure 12:
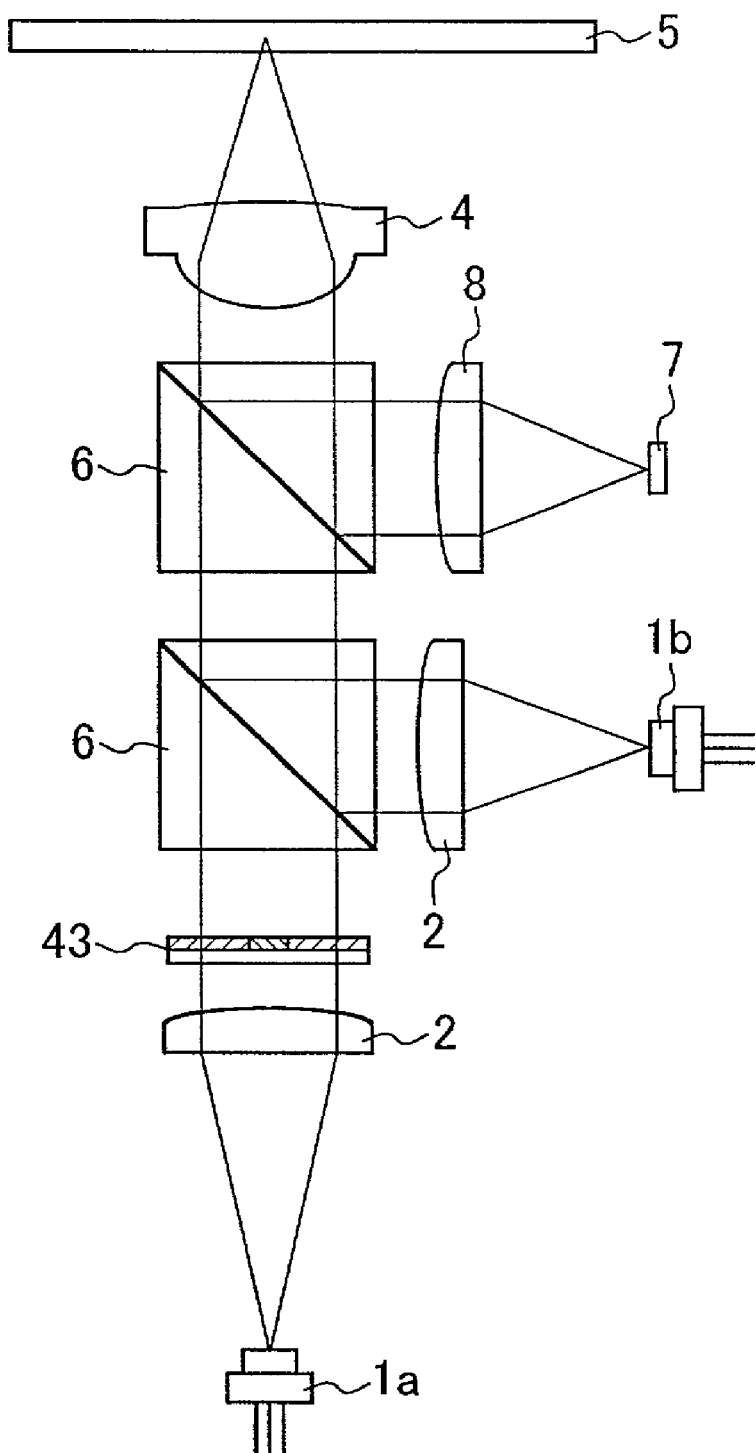
FIG. 12 is an explanatory view illustrating an optical pickup according to still another embodiment of the present invention.
Figure 13A:
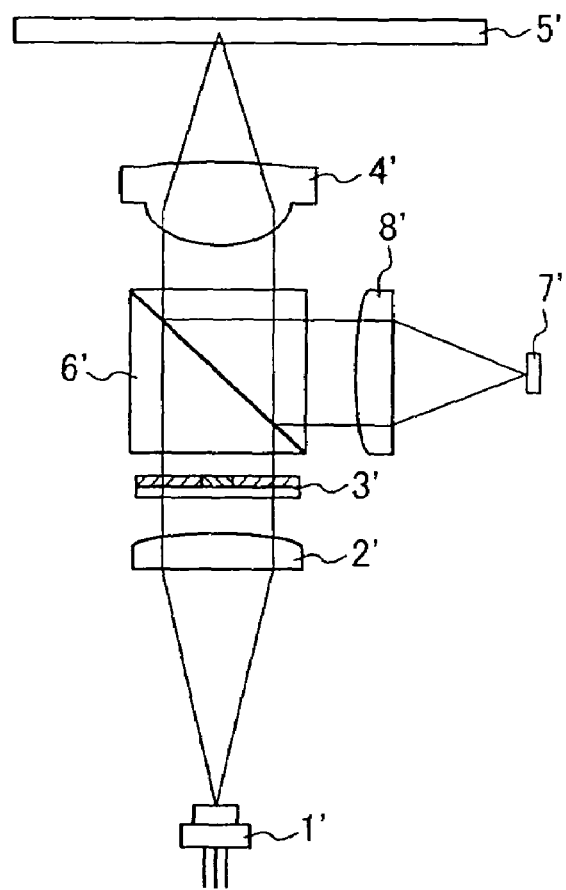
FIG. 13A is an explanatory view illustrating a schematic configuration of a conventional super-resolution optical pickup.
Figure 13B:
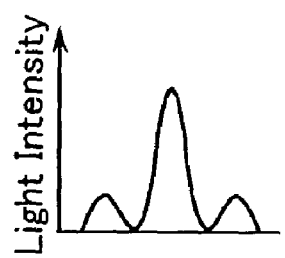
FIG. 13B is a graph showing a light intensity distribution of a light spot formed by the foregoing optical pickup.
Figure 13C:
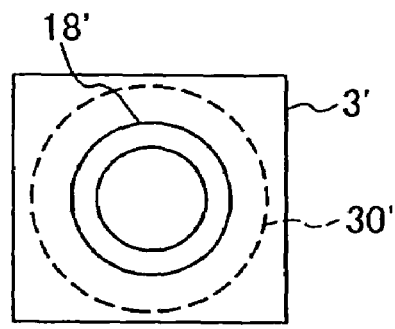
FIG. 13C is a plan view illustrating a configuration of a phase filter provided in the foregoing optical pickup.

Alternatively, an optical pickup as illustrated in FIG. 12 also is an embodiment of the present invention. The optical pickup includes two semiconductor lasers 1, and the phase filter 43 as described above in an optical path of light emitted from the semiconductor laser 1a, that is, one of the foregoing two. The semiconductor laser 1a is used as a light source in a recording operation, while the other semiconductor laser 1b is used in a reproducing operation, and an identical effect to the above can be obtained.

The present invention thus enables recording/reproduction of a rewritable high-density optical disk having tracks at high densities.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical pickup that is provided in an information recording/reproducing device and performs both information recording and information reproduction on/from an information carrier by irradiating the information carrier with light, comprising:
   a coherent light source;
   a focusing optical system that converges and directs light from the coherent light source onto an information carrier; and
   a spot size adjustor that adjusts a size of a light spot so that a size of a light snot in a direction perpendicular to an information track is $d_1$ in an information reproducing operation and the size of a light spot in the direction perpendicular to an information track is $d_2$ in an information recording operation, wherein $d_2 < d_1$ is satisfied;
   wherein the spat size adjustor includes:
   a variable wavelength plate that is disposed between the coherent light source and the focusing optical system and that is capable of varying a quantity of a phase shift; and
   a variable polarization phase filter tat is disposed between the variable wavelength plate and the focusing optical system and is divided into at least four regions to produce a phase difference in the direction perpendicular to the information track of the information carrier, so as to provide a phase shift of a desired quantity to only a polarized component of a first polarization type among the light from the coherent light source,
   the optical pickup further comprising:
   a polarized light separator that separates reflected light from the information carrier into a polarized component of the first polarization type, and a polarized component of a second polarization type that is different from the first polarization type;
   a first photodetector that detects the polarized component of the first polarization type of the reflected light from the information carrier; and
   a second photodetector that detects the polarized component of the second polarization type of the reflected light from the information carrier.

2. The optical pickup according to claim 1, wherein the variable wavelength plate includes a homogeneous-alignment liquid crystal element that is aligned in a direction tilted at approximately 45° to a polarization direction of light from the coherent light source.

3. The optical pickup according to claim 1, wherein the variable polarization phase filter includes a homogeneous-alignment liquid crystal element that is aligned in a direction parallel with a polarization direction of light from the coherent light source.

4. An optical information recording/reproducing device comprising the optical pickup according to claim 1, wherein:
   the four regions of the variable polarization phase filter are first, second, third, and fourth regions, respectively, arranged in the direction perpendicular to the information track of the information carrier;
   when information is recorded in the information carrier, phase shifts of different quantities are provided to the first and fourth regions, and the second and third regions, respectively, while no phase shift is provided to the variable wavelength plate; and
   when information is reproduced from the information carrier, phase shifts of different quantities that are different by $\pi$ are provided to the first and second regions, and the third and fourth regions, respectively, while a phase shift is provided to the variable wavelength plate so as to cause the variable wavelength plate to function as a half-wavelength plate.

* * * * *

UNITED STATES PATENT AND TRADEMARK OFFICE
CERTIFICATE OF CORRECTION

| | | |
|---|---|---|
| PATENT NO. | : 7,154,837 B2 | Page 1 of 1 |
| APPLICATION NO. | : 09/870095 | |
| DATED | : December 26, 2006 | |
| INVENTOR(S) | : Kasazumi et al. | |

It is certified that error appears in the above-identified patent and that said Letters Patent is hereby corrected as shown below:

Column 13, line 12(claim 1): "snot" should read --spot--.
Column 13, line 17(claim 1): "spat" should read --spot--.
Column 13, line 21(claim 1): "tat" should read --that--.

Signed and Sealed this

Seventh Day of August, 2007

JON W. DUDAS
*Director of the United States Patent and Trademark Office*